United States Patent
Cho et al.

(10) Patent No.: US 9,264,978 B2
(45) Date of Patent: Feb. 16, 2016

(54) APPARATUS AND METHOD FOR TRANSMITING AND RECEIVING SYSTEM INFORMATION IN A WIRELESS COMMUNICATION SYSTEM

(75) Inventors: Heejeong Cho, Anyang-si (KR); Kiseon Ryu, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 624 days.

(21) Appl. No.: 13/696,961

(22) PCT Filed: Jun. 27, 2011

(86) PCT No.: PCT/KR2011/004682
§ 371 (c)(1),
(2), (4) Date: Nov. 8, 2012

(87) PCT Pub. No.: WO2012/002689
PCT Pub. Date: Jan. 5, 2012

(65) Prior Publication Data
US 2013/0058283 A1 Mar. 7, 2013

(51) Int. Cl.
H04W 48/10 (2009.01)

(52) U.S. Cl.
CPC ..................................... H04W 48/10 (2013.01)

(58) Field of Classification Search
CPC ... H04W 40/04; H04W 68/00; H04W 68/005; H04W 72/04; H04W 76/025; H04W 84/045; H04W 92/02; H04W 48/10
See application file for complete search history.

(56) References Cited

U.S. PATENT DOCUMENTS

| | | | | |
|---|---|---|---|---|
| 8,379,567 B2 * | 2/2013 | Cho et al. | | 370/326 |
| 8,554,131 B2 * | 10/2013 | Lee et al. | | 455/3.01 |
| 8,638,757 B2 * | 1/2014 | Jung et al. | | 370/331 |
| 8,929,291 B2 * | 1/2015 | Kim et al. | | 370/328 |

OTHER PUBLICATIONS

Chang et al., "Updating Broadcast Messages (16.2.3.11)," IEEE 802.16 Broadband Wireless Access Working Group <http://ieee802.org/16>, IEEE C802.16m-10/0666, Apr. 30, 2010, 5 pages.
Chen et al., "Proposal on AAI_SCD Update (16.2.3.30)," IEEE 802.16 Broadband Wireless Access Working Group <http://ieee802.org/16>, IEEE C802.16m-10-0569r1, May 12, 2010, 3 pages.
Cho et al., Proposed Changes to the AAI_SCD Message Update (D5-16.2.3.30), IEEE 802.16 Broadband Wireless Access Working Group <http://ieee802.org/16>, IEEE C802.16m-10/0480r1, May 13, 2010, 3 pages.
Kim et al., "Proposed Text for Updating E-MBS Configuration Parameter in AAI_SCD Message (16.3.6.2.3)," IEEE 802.16 Broadband Wireless Access Working Group <http://ieee802.org/16>, Apr. 30, 2010, 6 pages.

* cited by examiner

Primary Examiner — Ayaz Sheikh
Assistant Examiner — Debebe Asefa
(74) Attorney, Agent, or Firm — Birch, Stewart, Kolasch & Birch, LLP

(57) ABSTRACT

An apparatus for transmitting and receiving system information in a wireless communication system and method thereof are disclosed. In method of receiving system information at a mobile station (MS) in a wireless communication system, the present invention includes the steps of transmitting a version of a broadcast message stored in the mobile station to a base station when failing to receive a broadcast message at a transmission time of the broadcast message or in a transmission interval of the broadcast message, and receiving a response message including the system information contained in the broadcast message being transmitted by the base station from the base station when the version of the broadcast message stored in the mobile station is different from that of the broadcast message being transmitted by the base station.

15 Claims, 9 Drawing Sheets

Fig. 8

| |
|---|
| FID |
| Type |
| Length |
| Purpose |
| If Purpose == 0b0 { |
| Uplink Power Status Related Field} |
| If purpose == 0b1 { |
| Version information} |

APPARATUS AND METHOD FOR TRANSMITTING AND RECEIVING SYSTEM INFORMATION IN A WIRELESS COMMUNICATION SYSTEM

CROSS REFERENCE TO RELATED APPLICATIONS

This application is the National Phase of PCT/KR2011/004682 filed on Jun. 27, 2011, which claims priority under 35 U.S.C. 119(e) to U.S. Provisional Application No. 61/359,367, filed on Jun. 29, 2010, all of which are hereby expressly incorporated by reference into the present application.

TECHNICAL FIELD

The present invention relates to a wireless communication system, and more particularly, to an apparatus for transmitting and receiving system information in a wireless communication system and method thereof.

BACKGROUND ART

First of all, a frame structure according to a related art is described with reference to FIG. 1 as follows. FIG. 1 is a diagram of a frame structure of IEEE (institute of electrical and electronics engineers) 802.16m system.

Referring to FIG. 1, a single superframe consists of 4 frames. And, each of the frames consists of 8 subframes. Moreover, each of the subframes consists of 5 or 6 OFDM (orthogonal frequency division multiplexing) symbols in accordance with a length of a cyclic prefix (hereinafter abbreviated CP).

A first subframe of the superframe includes a superframe header (hereinafter abbreviated SFH). And, the SFH includes essential system parameters and system configuration information. The SFH can be divided into a primary superframe header (hereinafter abbreviated P-SFH) and a secondary superframe header (hereinafter abbreviated S-SFH). The P-SFH is transmitted each superframe. And, information contained (or included) in the S-SFH is divided into a plurality of subpackets. And, a plurality of the subpackets differ from each other in transmission period.

Additional system information except the system information carried on the SFH is transmitted on a traffic channel. And, additional broadcast information carried on the traffic channel includes an extended system parameter & system configuration information and a signaling for downlink announcement.

The extended system parameter & system configuration information includes a system configuration parameter & information, which is not essential for a mobile station to access a network, used by the mobile station after completion of the access to the network. For instance, the extended system parameter & system configuration information includes information for handover, information for MIMO (multiple input multiple output) antenna, information for a relay, information for a femto cell, information for EMBS, information for inter-RAT, information on neighbor cells and the like. The signaling for the downlink announcement is to provide a network indication to a mobile station in idle or sleep mode.

Broadcast messages including the additional system information in IEEE 802.16m system include SCD (system configuration descriptor) message, NBR-ADV (neighbor advertisement) message, TRF-IND (traffic indication) message, PAG-ADV (BS broadcast paging) message, PGID (paging ID) information message, SS network CLK-CMP (clock comparison) message, SII-ADV (service identity broadcast) message, and LBS-ADV (location information broadcast for LBS) message.

The SCD message includes the information for the handover, the information for the MIMO, the information for the EMBS, and the information for the inter-RAT.

However, according to the related art, since a mobile station is not aware of a transmission timing point of a broadcast message including additional system information, it should decode the broadcast message each time to obtain a latest addition system information. Besides, if mobile stations in idle or sleep mode keep monitoring a presence or non-presence of a message until receiving a broadcast message including additional system information, it is inefficient in aspect of power saving. Meanwhile, a transmission delay occurs until the mobile station having entered an active mode from the idle or sleep mode receives the broadcast message including the additional system information. Besides, the mobile station needs to be aware whether to apply the additional system information contained in the broadcast message and also needs to be aware of a timing point of the application of the additional system information.

DISCLOSURE OF INVENTION

Technical Problem

However, as mentioned in the foregoing description, according to the related art, since a mobile station is not aware of a transmission timing point of a broadcast message including additional system information, system efficiency is lowered.

Solution to Problem

Accordingly, the present invention is directed to an apparatus for transmitting and receiving system information in a wireless communication system and method thereof that substantially obviate one or more of the problems due to limitations and disadvantages of the related art.

An object of the present invention is to provide an apparatus for updating system information and method thereof, by which system efficiency can be raised.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, a method of receiving system information at a mobile station (MS) in a wireless communication system, according to the present invention includes the steps of transmitting a version of a broadcast message stored in the mobile station to a base station when failing to receive a broadcast message at a transmission time (or point) of the broadcast message or in a transmission interval of the broadcast message and receiving a response message including the system information contained in the broadcast message being transmitted by the base station from the base station when the version of the broadcast message stored in the mobile station is different from a version of the broadcast message being transmitted by the base station.

Preferably, the response message includes a difference value between the system information contained in the broadcast message stored in the mobile station and the system information contained in the broadcast message being transmitted by the base station.

Preferably, the version of the broadcast message stored in the mobile station is transmitted using an uplink power status report header.

More preferably, the uplink power status report header includes a field indicating whether the uplink power status report header is for reporting an uplink power status report or for transmitting the version of the broadcast message.

Preferably, the mobile station finds the transmission time or the transmission interval using a transmission period of the broadcast message.

More preferably, the broadcast message includes the transmission period of the broadcast message.

In this case, the broadcast message further includes information on an interval in which the broadcast message is transmitted.

To further achieve these and other advantages and in accordance with the purpose of the present invention, a method of transmitting system information at a base station (BS) in a wireless communication system, includes the steps of transmitting a broadcast message at a transmission time of a broadcast message or in a transmission interval of the broadcast message, receiving a version of a broadcast message stored in a mobile station from the mobile station failing in receiving the broadcast message, and transmitting a response message including the system information contained in the broadcast message being transmitted by the base station to the mobile station when the received version is different from a version of the broadcast message being transmitted by the base station.

To further achieve these and other advantages and in accordance with the purpose of the present invention, a mobile station in a wireless communication system includes a transmitting module for transmitting a version of a broadcast message stored in the mobile station to a base station and a receiving module when a broadcast message is not received at a transmission time of the broadcast message or in a transmission interval of the broadcast message, receiving module for receiving a response message including system information contained in the broadcast message being transmitted by the base station from the base station when the version of the broadcast message stored in the mobile station is different from a version of the broadcast message being transmitted by the base station.

To further achieve these and other advantages and in accordance with the purpose of the present invention, a base station in a wireless communication system includes a receiving module for receiving a version of a broadcast message stored in a mobile station from the mobile station failing in receiving a broadcast message and a transmitting module for transmitting a response message including a system information contained in the broadcast message being transmitted by the base station to the mobile station when the received version is different from a version of the broadcast message being transmitted by the base station.

It is to be understood that both the foregoing general description and the following detailed description are exemplary and explanatory and are intended to provide further explanation of the invention as claimed.

Advantageous Effects of Invention

According to embodiments of the present invention, if a mobile station is unable to receive a broadcast message at a transmission timing point of the broadcast message, the mobile station transmits a version of a broadcast message stored therein and then received a changed system information, whereby overhead is lowered reduced but efficiency of system is raised.

BRIEF DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 8 is a diagram of an uplink power status report header according to an embodiment of the present invention.

BEST MODE FOR CARRYING OUT THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes IEEE 802.16 system, they are applicable to other random mobile communication systems except unique features of the IEEE 802.16 system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a mobile terminal is a common name of such a mobile or fixed user stage device as a user equipment (UE), a mobile station (MS), Advanced MS (AMS) and the like and assume that a base station is a common name of such a random node of a network stage communicating with a UE as a node B, eNode B and the like.

First of all, a system information transmitting and receiving method according to a first embodiment of the present invention is explained with reference to FIGS. 2 to 4 as follows. In the following description of an embodiment of the present invention, a system configuration descriptor (hereinafter abbreviated SCD) message is taken as an example, by which the present invention is non-limited.

A first embodiment of the present invention proposes three kinds of methods for a timing point at which changed system information is applied.

According to a first method, changed system information is applied after an application offset. According to a second method, a broadcast message includes an indicator field indicating whether to apply changed system information. According to a third method, the first and second methods are combined together.

Figure 1:
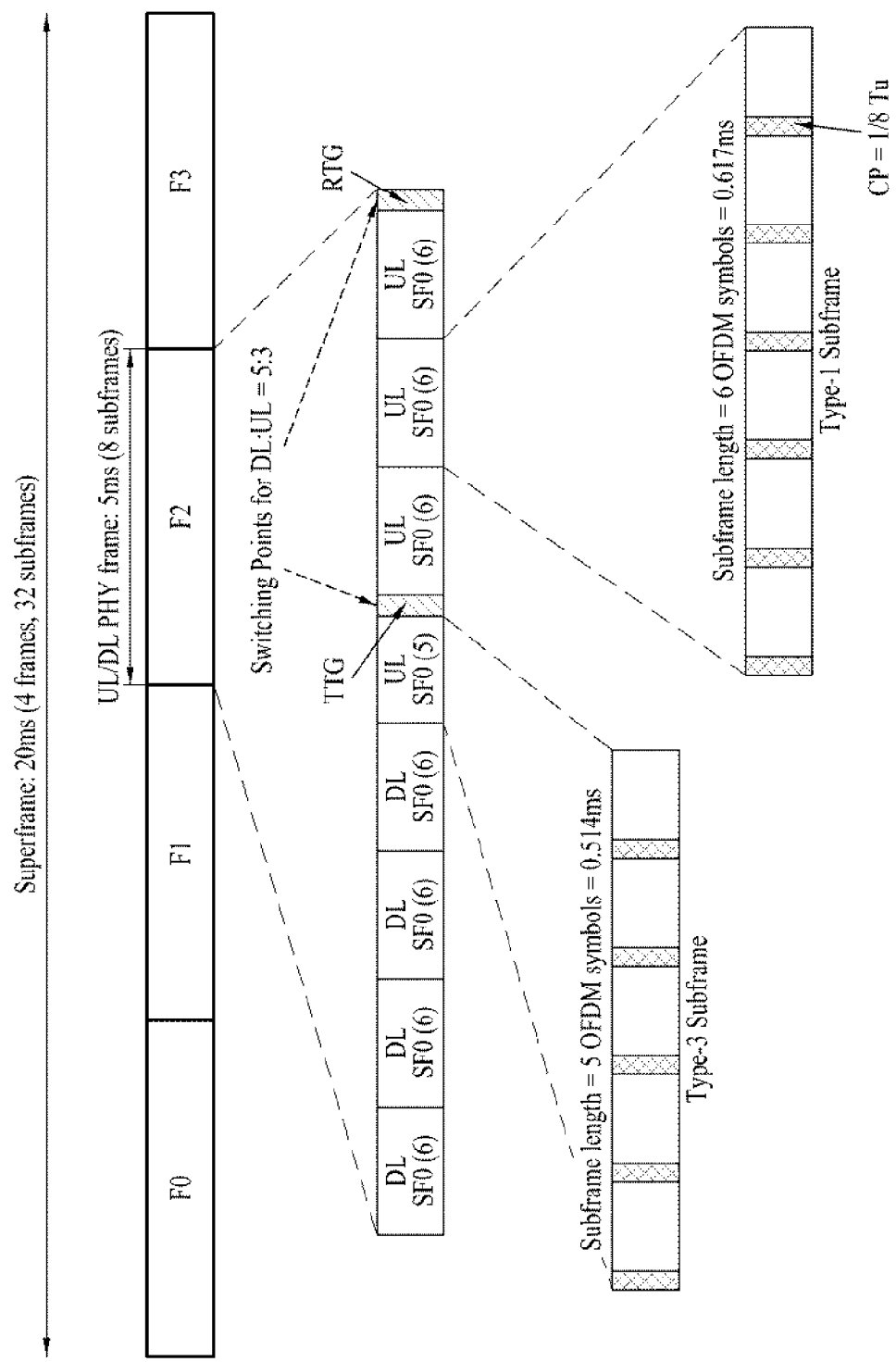
FIG. 1 is a diagram of a frame structure of IEEE (institute of electrical and electronics engineers) 802.16m system.
Figure 2:
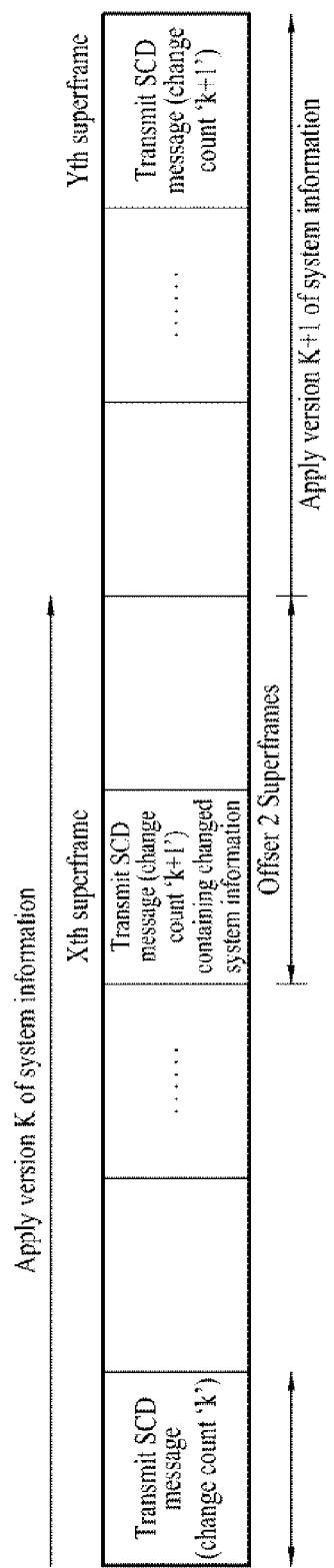
FIG. 2 is a diagram for a case of applying a changed system information after a specific offset.

FIG. 2 is a diagram for a case of applying changed system information after a specific offset.

Referring to FIG. 2, SCD message includes a change count. In this case, the change count indicates a version of system information in the SCD message.

Assume that a mobile station stores system information corresponding to a change count k. And, assume that an application offset is 2 superframes. The mobile station receives a broadcast message including changed system information and then applies the changed system information after the application offset from a broadcast message reception time (or point). In this case, the application offset is defined in advance between a base station and a mobile station or can be signaled to the mobile station by the base station.

A case that the mobile station is in an active mode is explained as follows.

First of all, the mobile station receives an SCD message, of which change count is set to k, in a first superframe. If so, the mobile station is able to recognize that the system information stored in itself has not been changed.

Thereafter, the mobile station receives an SCD message, of which change count is set to 'k+1', in xth superframe. If so, the mobile station is able to recognize that the system information in the SCD message has been changed. Therefore, the mobile station stores the changed system information contained in the SCD message and then applies the changed system information from (x+2)th superframe.

A case that the mobile station is in a sleep mode is explained as follows.

First of all, the mobile station in the sleep mode wakes up in yth superframe and then receives an SCD message including a change count different from that of system information currently stored in the mobile station. Accordingly, the mobile station is able to recognize that the system information in the SCD message has been changed. Although the system information in the SCD message corresponding to 'k+1' has been already applied, since the mobile station is unable to ensure whether the received SCD message corresponds to a first transmission of the SCD message in which the system information corresponding to 'k+1' is contained, the mobile station applies the changed system information from (y+2)th superframe.

Figure 3:
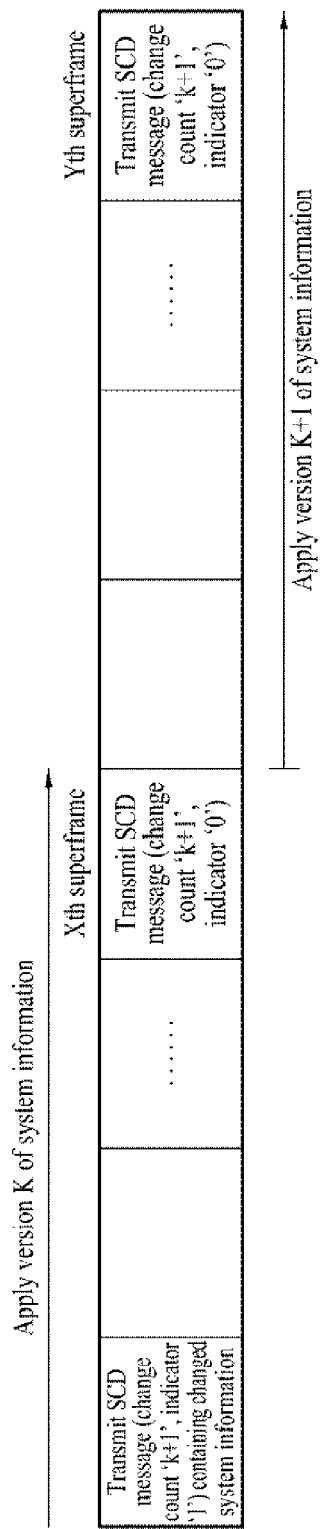
FIG. 3 is a diagram for a case that a broadcast message includes an indicator field indicating whether changed system information is applied.

FIG. 3 is a diagram for a case that a broadcast message includes an indicator field indicating whether changed system information is applied.

Referring to FIG. 3, SCD message includes a change count and an indicator.

In this case, the change count indicates a version of system information in the SCD message. And, the indicator indicates whether to apply system information corresponding to the change count in the SCD message. In particular, if the indicator is set to 1, it indicates that the system information corresponding to the change count of the SCD message is not applied. On the contrary, if the indicator is set to 0, it indicates that the system information corresponding to the change count of the SCD message is applied from a next superframe.

Assume that a mobile station stores system information corresponding to a change count k.

A case that the mobile station is in an active mode is explained as follows.

First of all, the mobile station receives an SCD message, of which change count is set to k+1, in a first superframe. If so, the mobile station is able to recognize that the system information in the SCD message has been changed. Therefore, the mobile station stores the changed system information. Yet, since the indicator is set to 1, the mobile station does not apply the system information corresponding to k+1. The mobile station determines again whether to apply the system information corresponding to k+1 after checking an indicator in a next received SCD message. In particular, the mobile station receives an SCD message in xth superframe. Since an indicator is set to 0, the mobile station applies a system information corresponding to k+1 from (x+1)th superframe.

A case that the mobile station is in a sleep mode is explained as follows.

First of all, the mobile station in the sleep mode wakes up in yth superframe and then receives an SCD message including a change count k+1 different from that k of a system information currently stored in the mobile station. Accordingly, the mobile station is able to recognize that the system information in the SCD message has been changed. Although the system information in the SCD message corresponding to 'k+1' has been already applied, since the mobile station is unable to ensure whether the received SCD message corresponds to a first transmission of the SCD message in which the system information corresponding to 'k+1' is contained, the mobile station stores the changed system information and then applies the changed system information from (y+1)th superframe.

Figure 4:
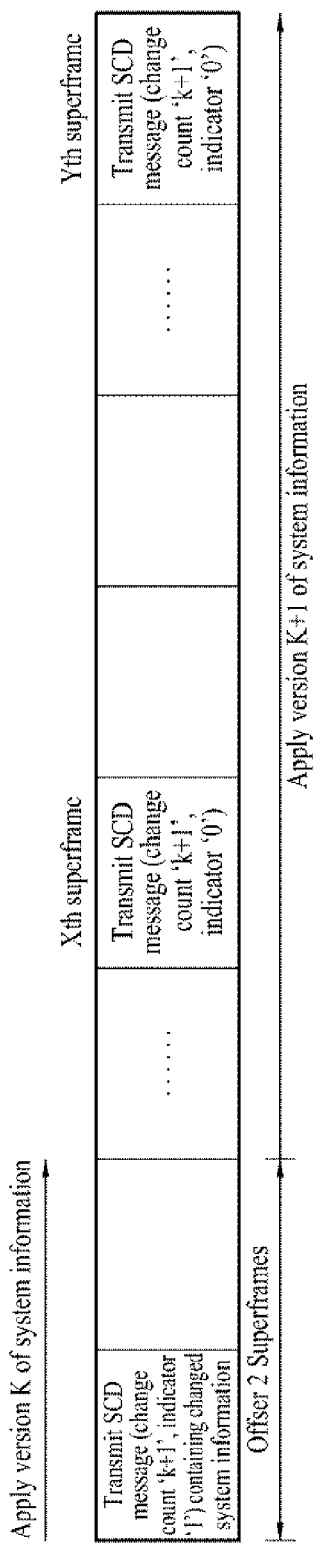
FIG. 4 is a diagram for a case of using both of a specific offset and an indicator.

FIG. 4 is a diagram for a case of using both of a specific offset and an indicator.

Referring to FIG. 4, SCD message includes a change count and an indicator. In this case, the change count indicates a version of system information in the SCD message. And, the indicator indicates whether to apply system information corresponding to the change count in the SCD message. In particular, if the indicator is set to 1, it indicates that the system information corresponding to the change count of the SCD message is not applied. On the contrary, if the indicator is set to 0, it indicates that the system information corresponding to the change count of the SCD message is applied.

Assume that a mobile station stores system information corresponding to a change count k. And, assume that an application offset is 2 superframes. The mobile station receives a broadcast message including changed system information, in which an indicator is set to 1, and then applies the changed system information after the application offset from a broadcast message reception time. In this case, the application offset is defined in advance between a base station and a mobile station or can be signaled to the mobile station by the base station.

A case that the mobile station is in an active mode is explained as follows.

First of all, the mobile station receives an SCD message, of which change count is set to k+1, in a first superframe. If so, the mobile station is able to recognize that the system information in the SCD message has been changed. Therefore, the mobile station stores the changed system information and then applies the changed system information from a third superframe.

A case that the mobile station is in a sleep mode is explained as follows.

First of all, the mobile station in the sleep mode wakes up in yth superframe and then receives an SCD message including a change count k+1 different from that k of a system information currently stored in the mobile station. Accordingly, the mobile station is able to recognize that the system information in the SCD message has been changed. As the indicator of the SCD message is set to 1, the mobile station is able to recognize that the system information corresponding to k+1 has been already applied. Therefore, the mobile station stores the changed system information and then directly applies the changed system information.

In the following description, transmitting and receiving method of transmitting and receiving system information according to a second embodiment of the present invention is explained with reference to FIGS. 5 to 8.

Figure 5:
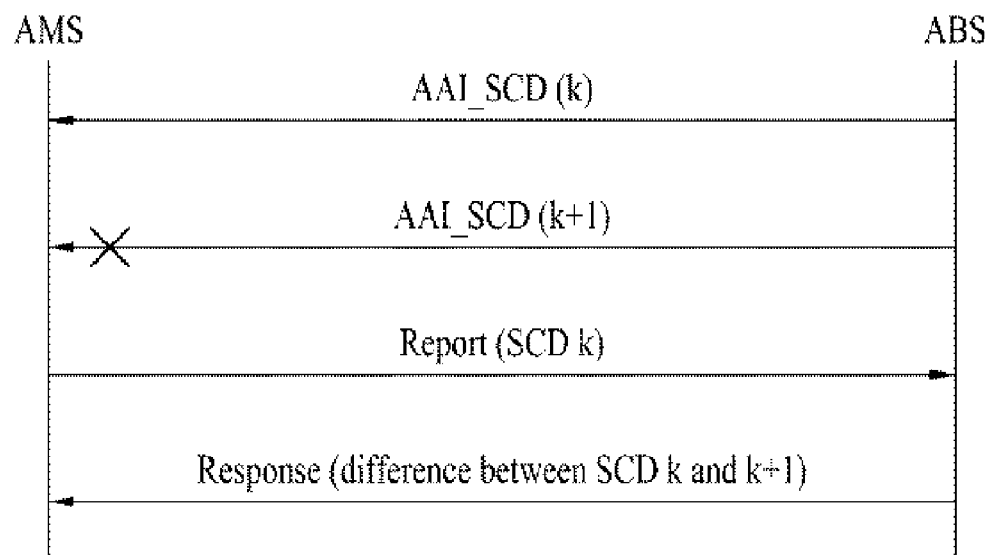
FIG. 5 is a diagram for a method of transmitting and receiving system information according to a second embodiment of the present invention.

FIG. 5 is a diagram for a method of transmitting and receiving system information according to a second embodiment of the present invention.

Referring to FIG. 5, a mobile station receives a specific broadcast message at a transmission time of the specific broadcast message or in a transmission interval of the specific broadcast message. In this case, the mobile station can obtain the transmission time (or point) or interval of the specific broadcast message through a transmission period of the specific broadcast message.

The mobile station is able to be implicitly aware of the transmission period of a corresponding message in a manner of receiving specific broadcast messages consecutively. Alternatively, if a base station sends a specific broadcast message in which information on a transmission period of the specific broadcast message is contained, the mobile station is able to obtain the transmission period by checking the information on the transmission period contained in the specific broadcast message.

A case that a base station sends a specific broadcast message, in which information on a transmission period of the specific broadcast message is contained by the base station, is described with reference to FIG. 6 and FIG. 7 as follows. The following description with reference to FIG. 6 and FIG. 7 takes an SCD message as an example, by which the present invention is non-limited.

Figure 6:
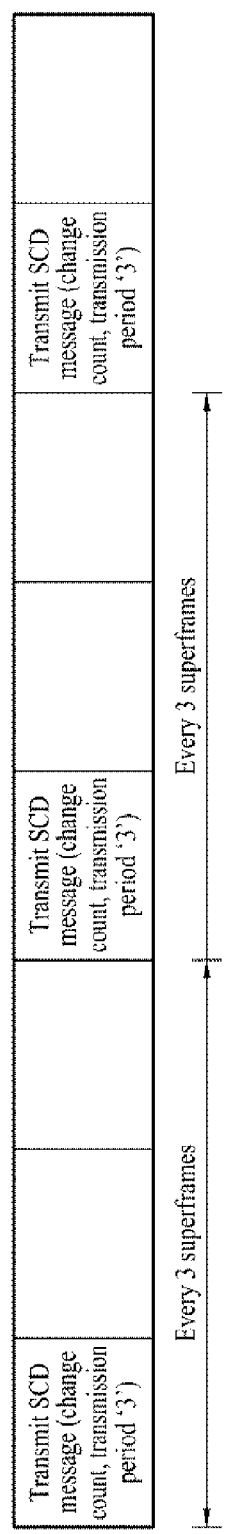
FIG. 6 is a diagram for a case that a broadcast message includes a transmission period.

FIG. 6 is a diagram for a case that a broadcast message includes a transmission period. And, FIG. 7 is a diagram for a case that a broadcast message includes a transmission period and interval.

Referring to FIG. 6, in case that a broadcast message includes a transmission period only, it can be transmitted at a transmission time only in accordance with a transmission period indicated by a transmission period field contained in the broadcast message. In particular, in FIG. 6, the transmission period field contained in the SCD message is set to 3. If so, the SCD message is transmitted each 3 superframes. If so, a mobile station receives the SCD message at the transmission time determined in accordance with the transmission period.

Figure 7:
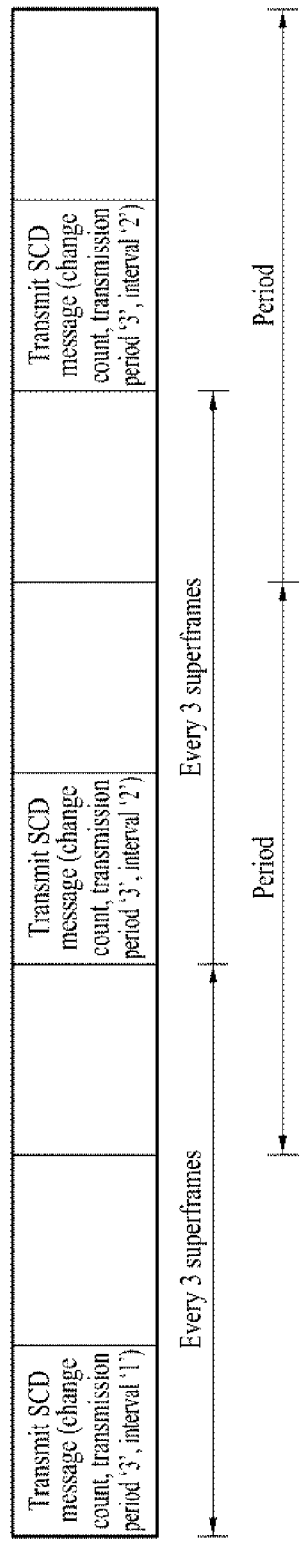
FIG. 7 is a diagram for a case that a broadcast message includes a transmission period and interval.

Referring to FIG. 7, in case that a broadcast message includes a transmission period and interval, the broadcast message can be transmitted in an interval indicated by an interval field contained in the broadcast message by having a start point (e.g., superframe No. Modulo transmission period) set to a transmission time in accordance with a transmission period indicated by a transmission period field contained in the broadcast message. In this case, the interval can be contained in the broadcast message. Alternatively, the interval can be signaled to a mobile station via another message except the broadcast message. Alternatively, the interval can bee defined in advance between a mobile station and a base station.

In FIG. 7, a transmission period is set to 3 and an interval of an SCD message transmitted in a first superframe is set to 1. If the interval is set to 1, it means that the interval for transmitting the SCD message is a superframe corresponding to a transmission time in accordance with the transmission period.

An interval of an SCD message transmitted in a third superframe is set to 2. If the interval is set to 2, it means that the SCD message can be transmitted between a superframe right before the superframe corresponding to the transmission time in accordance with the transmission period and a superframe right after the superframe corresponding to the transmission time in accordance with the transmission period. In particular, referring to FIG. 7, the transmission time in accordance with the transmission period is a fourth superframe. As the interval is set to 2, the SCD message can be transmitted in one of third, fourth and fifth superframes.

A mobile station receives a broadcast message at a transmission time or in a transmission interval, which is determined in the above-described manner. If so, the mobile station checks a change count in the broadcast message to recognize whether system information is changed. In particular, if the change count in the broadcast message is equal to a change count of system information stored in the mobile station, the mobile station determines that the system information has not been changed. On the contrary, if the change count in the broadcast message is different from a change count of system information stored in the mobile station, the mobile station determines that the system information has been changed and then stores the changed information. Thereafter, the mobile station is able to apply the changed system information by the above-mentioned method according to the first embodiment of the present invention.

Yet, if the mobile station fails to receive the broadcast message at the transmission time determined by the above-described method or in the transmission interval determined by the above-described method, the mobile station transmits a version of the broadcast message stored therein to the base station. In this case, the version can include a change count. In particular, referring to FIG. 5, the mobile station receives the SCD message including the change count set to k and then stores the system information due to the change count set to k. Thereafter, if the mobile station fails to receive the SCD message at the transmission time or in the transmission interval of the SCD message, the mobile station transmits the change count k stored therein to the base station.

In doing so, the mobile station defines a new message and then transmits the version of the broadcast message stored in the mobile station or is able to transmit the version of the broadcast message stored in the mobile station using a previously defined message.

Alternatively, the mobile station is able to transmit the version of the broadcast message stored in the mobile station using an uplink power status report header that is a header used for an uplink power status report. In particular, the mobile station is able to transmit the version of the broadcast message stored in the mobile station via the uplink power status report header instead of information on an uplink power status at the timing point of making the uplink power status report.

FIG. 8 is a diagram of an uplink power status report header according to an embodiment of the present invention.

Referring to FIG. 8, a field 'Purpose' can be added to an uplink power status report header in order to indicate whether the uplink power status report header is provided for an uplink power status report or a transmission of a version of a broadcast message. In particular, if the field 'Purpose' is set to 0, the uplink power status report header is able to include information on an uplink power status. If the field 'Purpose' is set to 1, the uplink power status report header is able to include information on a version of a broadcast message.

If a version received from a mobile station is equal to a version of a broadcast message that is being transmitted by a base station, the base station sends a response message including latest system information to the mobile station. In doing so, the base station is able to send the response message to the mobile station in a manner that a difference value between system information corresponding to the version received from the mobile station and the latest system information, which is being transmitted by the base station, is contained in the response message. This is to reduce overhead. In this case, the response message can include a newly defined message or a previous SCD message can be separately sent to the corresponding mobile station only.

If the mobile station receives the response message, the mobile station updates system information using the information contained in the response message.

Figure 9:
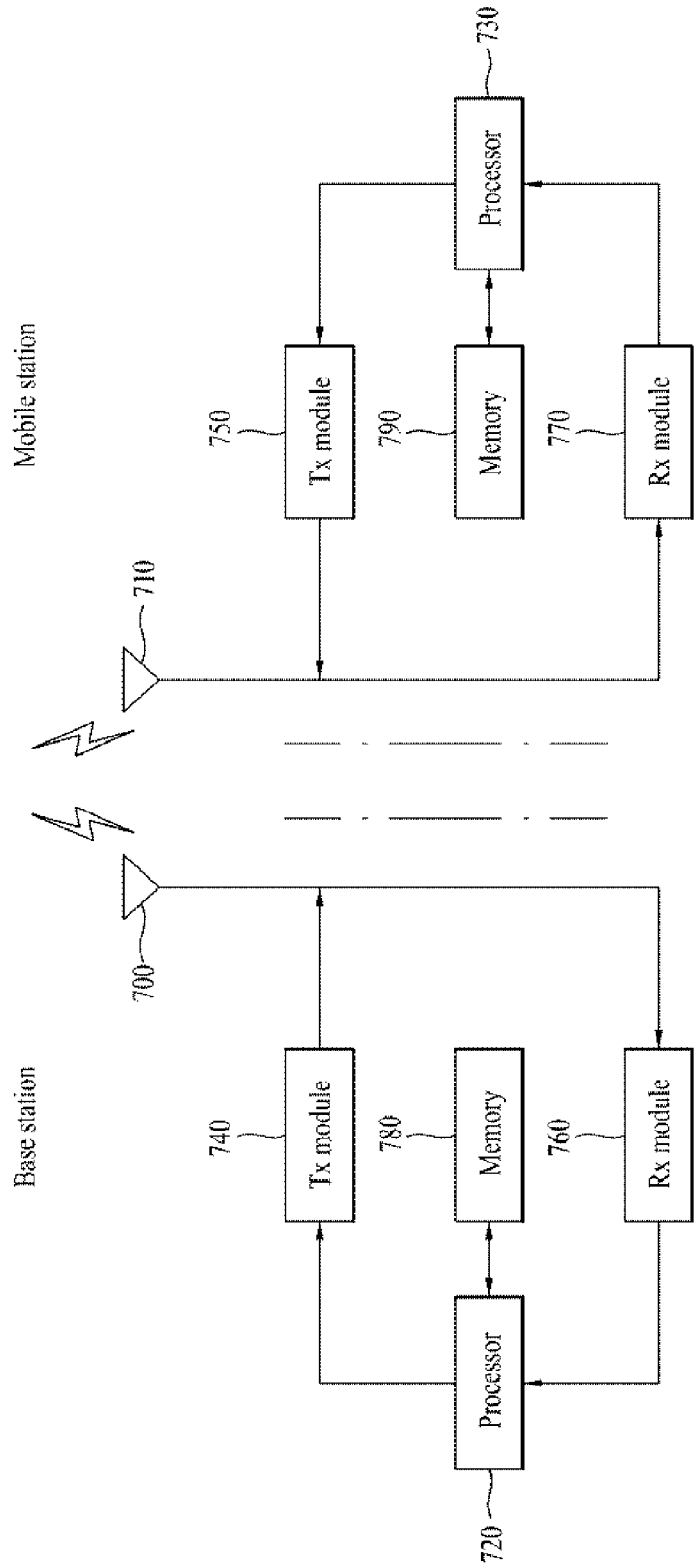
FIG. 9 is a diagram for configurations of a mobile station and a base station to implement embodiments of the present invention.

FIG. 9 is a diagram for configurations of a mobile station and a base station to implement embodiments of the present invention.

Referring to FIG. 9, a mobile station (AMS)/base station (ABS) includes an antenna 700/710 capable of transmitting and receiving information, data, signals, messages and/or the like, a transmitting module (Tx module) 740/750 transmitting a message by controlling the antenna, a receiving module (Rx module) 760/770 receiving a message by controlling the corresponding antenna, a memory 780/790 storing informations associated with communications with a base station, and a processor 720/730 controlling the transmitting module, the receiving module and the memory. In this case, the base station can include a femto base station or a macro base station.

The antenna 700/710 externally transmits a signal generated from the transmitting module 740/750. And, the antenna 700/710 receives a radio signal from outside and then delivers the received radio signal to the receiving module 760/770. In case that a multi-antenna (MIMO) function is supported, at least two antennas can be provided to the mobile station or the base station.

The processor 720/730 generally controls overall operations of the mobile/base station. In particular, the processor 720/730 is able to perform a control function for performing the above-described embodiments of the present invention, a MAC (medium access control) frame variable control function according to service characteristics and propagation environment, a handover function, an authentication function, an encryption function and the like. And, the processor 720/730 can further include an encryption module configured to encrypt various messages and a timer module configured to control transmissions and receptions of the various messages.

The transmitting module 740/750 performs prescribed coding and modulation on a signal and/or data, which is scheduled by the corresponding processor and will be then transmitted externally, and is then able to deliver the coded and modulated signal and/or data to the antenna 700/710.

The receiving module 760/770 reconstructs the radio signal received externally via the antenna 700/710 into original data in a manner of performing decoding and demodulation on the received radio signal and is then able to deliver the reconstructed original data to the processor 720/730.

The memory 780/790 can store programs for the processing and control of the corresponding processor and is able to perform a function of temporarily storing input/output data (e.g., in case of the mobile station, UL grant allocated by the base station, system information, station identifier (STID), a flow identifier (FID), an action time, region allocation information, frame offset information, etc.).

And, the memory 780/790 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

INDUSTRIAL APPLICABILITY

Apparatus and method for transmitting and receiving system information is industrially applied to wireless communication system such as IEEE 802.16, 3GPP LTE, LTE-A, and like that.

The invention claimed is:

1. A method of receiving system information at a mobile station (MS) in a wireless communication system, the method comprising:
   transmitting, at a transmission time of an uplink status report, a version of a broadcast message stored in the MS to a base station (BS) using an uplink power status report header if failing to receive the broadcast message at a transmission time of the broadcast message or in a transmission interval of the broadcast message, wherein the uplink power status report header includes a change count indicating the version of the broadcast message stored in the MS instead of information for uplink power status; and
   receiving a response message including the system information contained in the broadcast message being transmitted by the BS from the BS when the version of the broadcast message stored in the MS is different from a version of the broadcast message being transmitted by the BS.

2. The method of claim 1, wherein the response message includes a difference value between the system information contained in the broadcast message stored in the MS and the system information contained in the broadcast message being transmitted by the BS.

3. The method of claim 1, wherein the uplink power status report header includes a field indicating whether the uplink power status report header is for reporting an uplink power status or for transmitting the version of the broadcast message.

4. The method of claim 1, wherein the MS acquires the transmission time of the broadcast message or the transmission interval of the broadcast message using a transmission period of the broadcast message.

5. The method of claim 4, wherein the broadcast message includes the transmission period of the broadcast message.

6. The method of claim 5, wherein the broadcast message further includes information on an interval in which the broadcast message is transmitted.

7. A method of transmitting system information at a base station (BS) in a wireless communication system, the method comprising:
   transmitting a broadcast message at a transmission time of a broadcast message or in a transmission interval of the broadcast message;
   receiving, at a time for an uplink status report of a mobile station (MS), a version of a broadcast message stored in the MS using an uplink power status report header from the MS failing in receiving the broadcast message, wherein the uplink power status report header includes a change count indicating the version of the broadcast message stored in the MS instead of information for uplink power status; and
   transmitting a response message including the system information contained in the broadcast message being transmitted by the BS to the MS when the received version is different from a version of the broadcast message being transmitted by the BS.

8. The method of claim 7, wherein the response message includes a difference value between the system information contained in the broadcast message stored in the MS and the system information contained in the broadcast message being transmitted by the BS.

9. The method of claim 7, wherein the uplink power status report header includes a field indicating whether the uplink power status report header is for reporting an uplink power status or for transmitting the version of the broadcast message.

10. A mobile station (MS), comprising:
    a transmitting module configured to transmit, at a transmission time of an uplink status report, a version of a broadcast message stored in the MS to a base station (BS) using an uplink power status report header when a broadcast message is not received at a transmission time of the broadcast message or in a transmission interval of the broadcast message, wherein the uplink power status report header includes a change count indicating the version of the broadcast message stored in the MS instead of information for uplink power status; and
    a receiving module configured to receive a response message including system information contained in the broadcast message being transmitted by the BS from the BS when a version of the broadcast message stored in the MS is different from a version of the broadcast message being transmitted by the BS.

11. The MS of claim 10, wherein the response message contains a difference value between the system information contained in the broadcast message stored in the MS and the system information contained in the broadcast message being transmitted by the BS.

12. The MS of claim 10, wherein the uplink power status report header includes a field indicating whether the uplink power status report header is for reporting an uplink power status or for transmitting the version of the broadcast message.

13. A base station (BS), comprising:
    a receiving module configured to receive, at a time for an uplink status report of a mobile station (MS), a version of a broadcast message stored in the MS using an uplink power status report header from the MS failing in receiving a broadcast message, wherein the uplink power status report header includes a change count indicating the version of the broadcast message stored in the MS instead of information for uplink power status; and
    a transmitting module configured to transmit a response message including system information contained in the broadcast message being transmitted by the BS to the MS when the received version is different from a version of the broadcast message being transmitted by the BS.

14. The BS of claim 13, wherein the response message includes a difference value between system information contained in the broadcast message stored in the MS and the system information contained in the broadcast message being transmitted by the BS.

15. The BS of claim 13, wherein the uplink power status report header includes a field indicating whether the uplink power status report header is for reporting an uplink power status report or for transmitting the version of the broadcast message.

* * * * *